US008332456B2

(12) United States Patent
Canning et al.

(10) Patent No.: US 8,332,456 B2
(45) Date of Patent: Dec. 11, 2012

(54) DISPLAYING SERVER ERRORS ON THE CLIENT MACHINE THAT CAUSED THE FAILED REQUEST

(75) Inventors: Benjamin E. Canning, Seattle, WA (US); Phillip I. Beish, Duvall, WA (US); Shaun P. Eagan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 11/940,213

(22) Filed: Nov. 14, 2007

(65) Prior Publication Data

US 2009/0125580 A1 May 14, 2009

(51) Int. Cl.
  G06F 17/30 (2006.01)
  G06F 17/40 (2006.01)
  H04L 29/06 (2006.01)
(52) U.S. Cl. ........ 709/201; 709/203; 709/212; 709/228; 709/244
(58) Field of Classification Search .................. 709/203, 709/201
  See application file for complete search history.

(56) References Cited

U.S. PATENT DOCUMENTS

| | | | | |
|---|---|---|---|---|
| 5,862,325 A * | 1/1999 | Reed et al. | ..................... | 709/201 |
| 6,151,602 A | 11/2000 | Hejlsberg et al. | ................ | 707/10 |
| 6,347,330 B1 | 2/2002 | Dawson et al. | ................ | 709/203 |
| 6,594,697 B1 | 7/2003 | Praitis et al. | .................. | 709/225 |
| 6,631,402 B1 | 10/2003 | Devine | | |
| 6,760,736 B2 | 7/2004 | Waldo et al. | .................. | 707/206 |
| 6,915,454 B1 | 7/2005 | Moore | | |
| 6,944,849 B1 * | 9/2005 | Glerum et al. | ................. | 717/127 |
| 7,010,503 B1 | 3/2006 | Oliver et al. | ..................... | 705/26 |
| 7,035,921 B1 | 4/2006 | Baker | ........................... | 709/224 |
| 7,152,112 B2 | 12/2006 | Juster | ............................ | 709/229 |
| 7,159,028 B1 | 1/2007 | Jones et al. | ................... | 709/230 |
| 7,225,249 B1 | 5/2007 | Barry et al. | ................... | 709/227 |
| 2002/0165961 A1 * | 11/2002 | Everdell et al. | ............... | 709/225 |
| 2003/0069923 A1 * | 4/2003 | Peart | ............................ | 709/203 |
| 2003/0074393 A1 * | 4/2003 | Peart | ............................ | 709/203 |
| 2003/0126195 A1 * | 7/2003 | Reynolds et al. | ............. | 709/203 |
| 2003/0140284 A1 | 7/2003 | Dettinger | | |
| 2007/0168496 A1 | 7/2007 | Bansod et al. | ................ | 704/224 |
| 2007/0204012 A1 | 8/2007 | Kruse et al. | ................... | 709/219 |

OTHER PUBLICATIONS

"Sedna Client/Server Protocol"; accessed via http://www.modis.ispras.ru/sedna/serverprotocol/clientserverprotocol.html on Oct. 8, 2007; 14 pgs.

(Continued)

*Primary Examiner* — Asad Nawaz
*Assistant Examiner* — Jason Harley
(74) *Attorney, Agent, or Firm* — Merchant & Gould

(57) ABSTRACT

Computer-implemented methods and computer-readable storage media are disclosed relating to displaying server errors on the client computing system that caused the failed request. A client listener application configured to execute on a client computing system. The client listener application is further configured to exchange data over a network with a server system, and provide metadata to the server system identifying the client computing system in association with a client request for execution of code on the server system. The client listener program is configured to receive an assert message indicating an error resulting from the execution of the code on the server and signal receipt of the assert message over a user interface. The client listener program is further configured to provide an opportunity for a user to respond to the assert message via the user interface by choosing to ignore the assert message or to analyze the error.

20 Claims, 11 Drawing Sheets

OTHER PUBLICATIONS

WebsiteSource; "*Website Hosting Guides—Server Error Codes / Tutorial*"; accessed via http://www.websitesource.com/tutorials/error-codes.html on Oct. 8, 2007; 5 pgs.

Apache; "*Apache HTTP Server Version 1.3; Using XSSI and ErrorDocument to configure customized international server error responses*"; accessed via http://httpd.apache.org/docs/1.3/misc/custom_errordocs.html on Oct. 8, 2007; 5 pgs.

International Search Report mailed May 20, 2009, in PCT Application No. PCT/US2008/082360.

* cited by examiner

DISPLAYING SERVER ERRORS ON THE CLIENT MACHINE THAT CAUSED THE FAILED REQUEST

BACKGROUND

In developing software in a conventional manner, a user submits a request to a host or server system where code is executed. As the server system executes the code, when an error occurs, a local debug assert is generated. The resulting asserts are stored in a server log file. Subsequently, the developer can review the results of the execution of the code by proactively checking the server log file and searching for asserts relating to the execution of the code. When the developer finds relevant asserts in the log file, the developer then attempts to identify and correct the cause of the error or errors that resulted in the asserts.

Placing the burden on software developers to have to hunt for the errors resulting from the execution of their code makes debugging software more cumbersome and difficult. It would aid developers in debugging code if the assert messages resulting from errors could be more directly associated with the code that resulted in the generation of those messages.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Computer-implemented methods and computer-readable storage media are disclosed relating to displaying server errors on the client computing system that caused the failed request. A client listener application is configured to execute on a client computing system. The client listener application is further configured to exchange data over a network with a server system, and provide metadata to the server system identifying the client computing system in association with a client request for execution of code on the server system. The client listener program is configured to receive an assert message indicating an error resulting from the execution of the code on the server and signal receipt of the assert message over a user interface. The client listener program is further configured to provide an opportunity for a user to respond to the assert message via the user interface by choosing to ignore the assert message or to analyze the error.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

DETAILED DESCRIPTION OF IMPLEMENTATIONS

This detailed description describes implementations of displaying assert messages on a client computing system to present errors occurring in the execution of code on the server system. According to implementations of the present disclosure, a client listener program operates on the client computing system and operates in conjunction with a server system. When the client computing system requests execution of code on the server system, metadata providing information about the client computing system is associated with the request and provided to the server system. The server maintains the metadata at least while the code is executing. Then, if an error occurs during the execution of the code, the server system identifies the metadata associated with the code and presents an assert message to the client computing system. Using information contained in the metadata, the server system is able to identify the client computing system submitting the code and communicate the assert message to the appropriate client.

The client listener program presents the assert message to the user and gives the user an opportunity to respond to the assert message. For example, the user can choose to ignore the assert message, ignore all subsequent assert messages or assert messages of a certain type, or may choose to debug the code at that time. The user of the client computing system thus receives a near real-time response regarding the execution of the code to which the user can contemporaneously respond.

Illustrative Operating Environment

Implementations of the present disclosure may be supported by a variety of computing devices. According to implementations of the present disclosure, the client computing devices communicate with a server system over a network. Both the client computing systems and the server system may include variations of a general purpose computing system that support implementations of the present disclosure.

Figure 1:
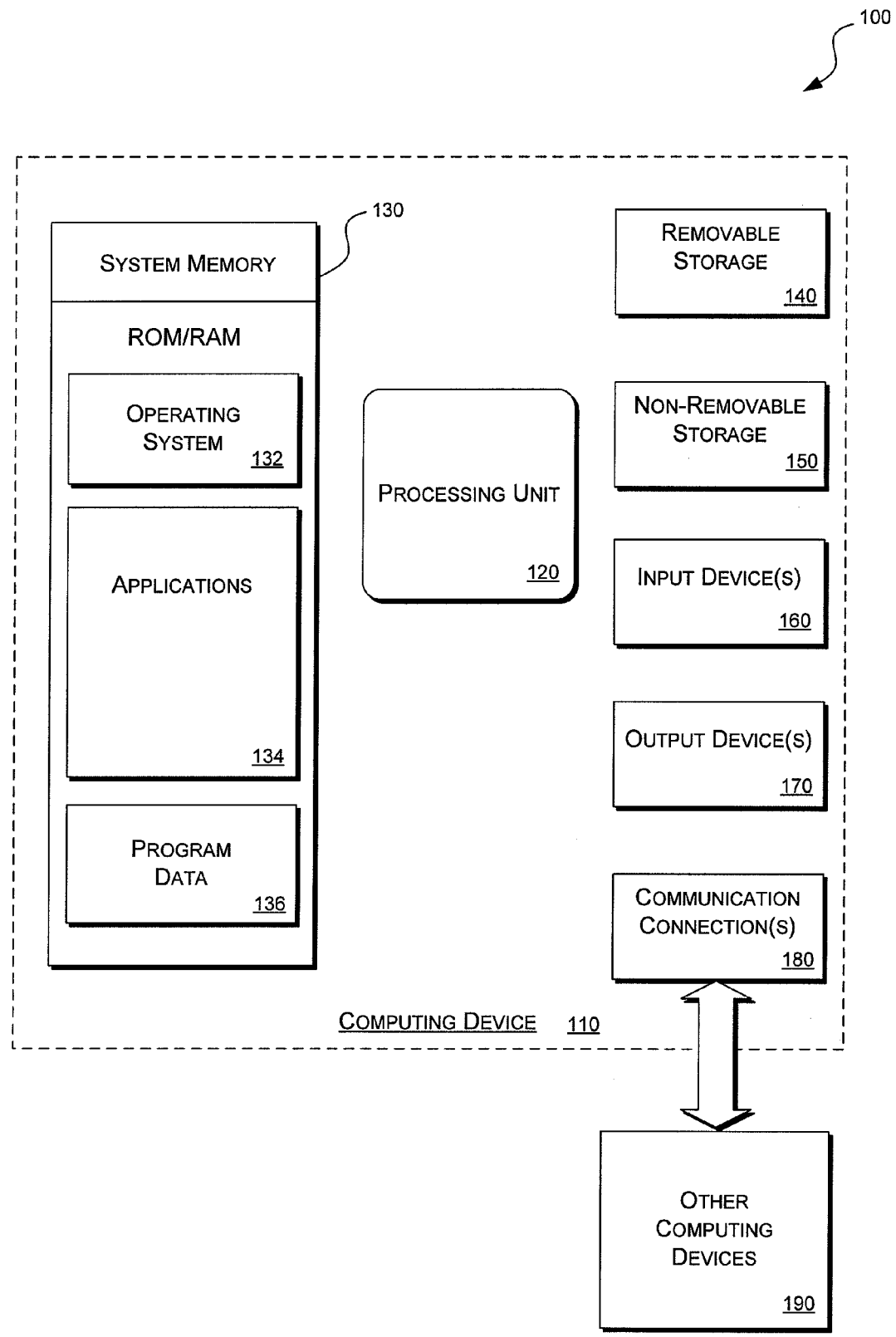
FIG. 1 is a block diagram of an operating environment supporting computer-implemented methods and computer-readable media implementations of the present disclosure.

FIG. 1 is a block diagram of a representative operating environment 100 operable to support computer-implemented methods and computer-readable media as herein described. The operating environment is representative of both a client computing system operable to run a client listener program and the server system on which the code is executed, as well as to communicate with each other over a network.

Referring to FIG. 1, an exemplary operating environment 100 includes a computing device 102. In a basic configuration, the computing device 102 may include any of a number of forms of stationary or mobile computing devices. The computing device 102 typically includes at least one processing unit 104 and a system memory 106. Depending on the exact configuration and type of computing device, the system memory 106 may be volatile (such as RAM), non-volatile (such as ROM, flash memory, and the like) or some combination of the two. The system memory 106 typically maintains an operating system 108, one or more applications 110, and program data 112.

The computing device 102 may also have additional features or functionality. For example, the computing device 102 may also include additional data storage devices (removable and/or non-removable) such as, for example, magnetic disks, optical disks, nonvolatile memory storage, and other types of storage devices. Such additional storage is illustrated in FIG. 1 by removable storage 114 and non-removable storage 116. Computer storage media may include volatile and non-volatile, removable and non-removable media implemented in any method or technology for storage of information, such as computer readable instructions, data structures, program modules or other data. The system memory 106, the removable storage 114, and the non-removable storage 116 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 102. Any such computer storage media may be part of the computing device 102. The computing device 102 may also have input device(s) 118 such as a keyboard, mouse, pen, voice input device, touch input device, etc. Output device(s) 120 such as a display, speakers, printer, etc., may also be included.

The computing device 102 also may include one or more communication connections 122 that allow the computing device 102 to communicate with other computing devices 124, such as over a network or a wireless network. The one or more communication connections 122 are an example of communication media. Available forms of communication media typically carry computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 2:
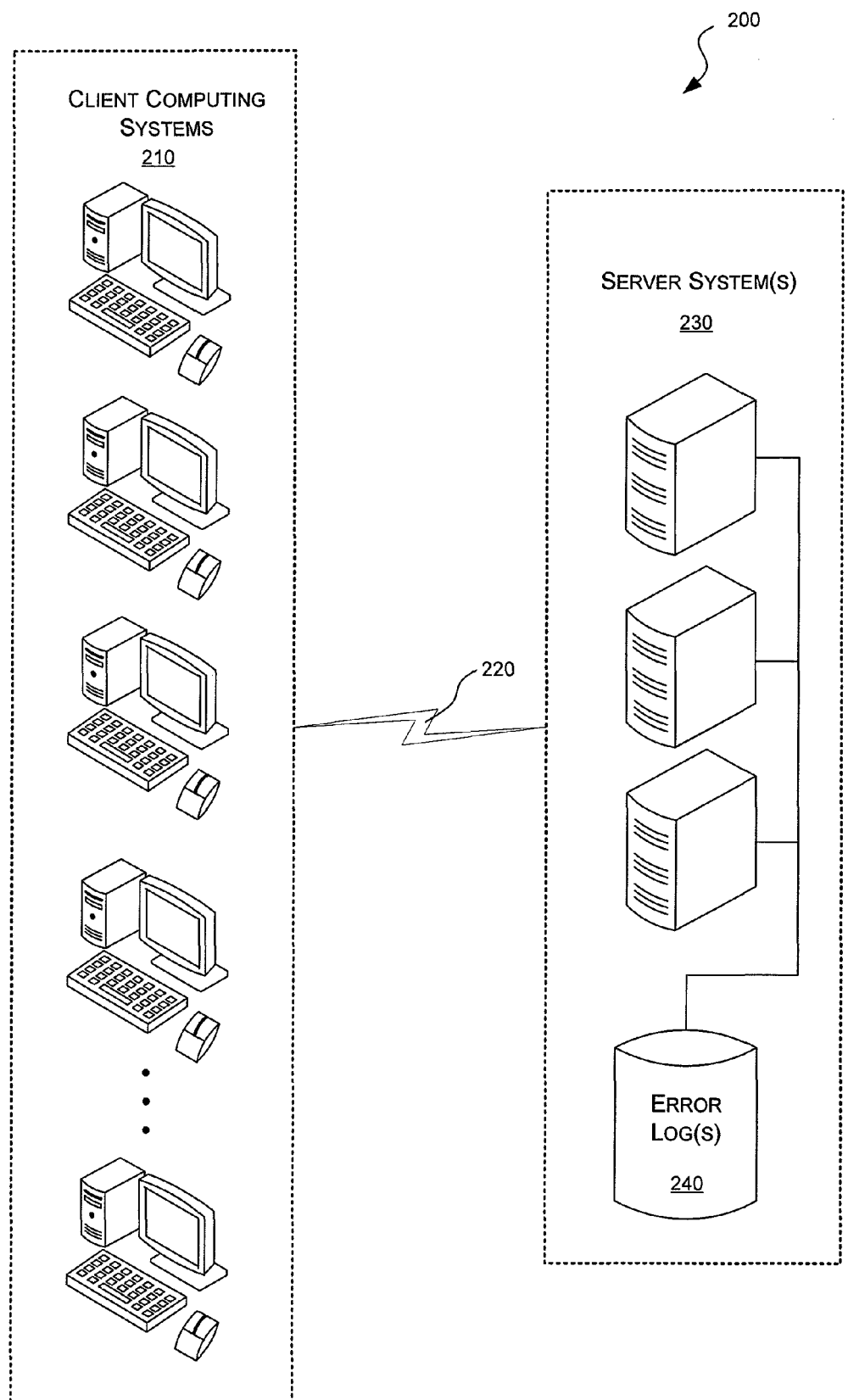
FIG. 2 is a block diagram of a network including client computing systems and a server system used in development and debugging of software.

FIG. 2 illustrates a network environment 200 in which a plurality of client computing systems 210 communicate over a network 220 with one or more server systems 230. The client computing systems 210 may include different types of computing systems. For example, a client computing system may include a desktop computing system as shown in FIG. 2. Alternatively, the client computing systems 210 may include laptop or notebook computers, handheld computing systems, or other computing devices. Implementations of the present disclosure may operate with a range of computing systems operable to submit code for execution over the network 220 to the server system 230. A client listener application, as described below, may be adapted to operate on various computing systems.

The server system or systems 230 receive requests over the network 220 from client computing systems 210 to execute code. Upon encountering an error in the execution of code, the server system 230 will log the error in one or more error logs 240. As previously described, in a conventional system, the server system 230 would record the errors in the error log 240, and it would be up to users of the client computing systems 210 to later access the error log 240, find errors in the execution of the code that was submitted, and trace through the error log 240 to try to identify and correct or debug the cause of the error. According to implementations of the present disclosure, information about errors that occur also is desirably stored in the error log 240 to allow subsequent access to the errors recorded.

In addition, however, and as further described below, upon the occurrence of an error, the server system 230 also generates assert messages and directs them to the client computing system submitting the request that resulted in the error. In other words, when the client computing system is configured to receive such assert messages, the server can "push" the assert messages to the client to inform the client of the assert message. The client also can be empowered to control program flow based on the generation and receipt of an assert message as further described below.

According to implementations of the present disclosure, a client computing system seeking to receive the assert message and/or control program flow based on the generation of the assert message operates a client listener program. The client listener program communicates metadata to the server system indicating that a client listener program is active on a client computing system to receive and respond to assert messages. The metadata also provides information to the server system describing how the server system can direct assert messages to the client computing system presenting the code for execution. A client listener program receiving such an assert message presents the message to a user, allowing the user an opportunity to respond to the message, as described further below.

Overview of Interaction of a Client Listener Program and a Server System

Figure 3:
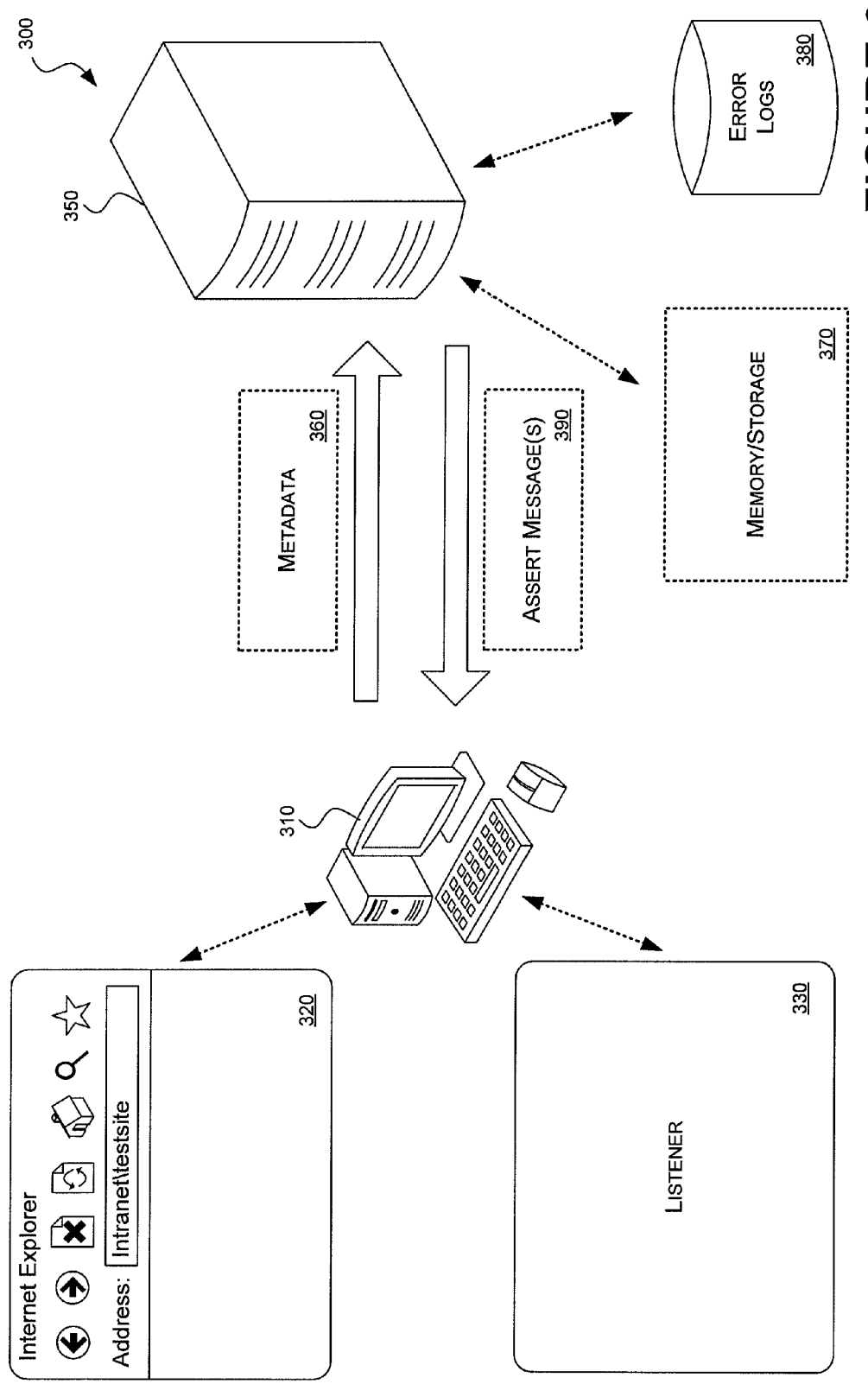
FIG. 3 is a block diagram of a client computing system requesting execution of code on a server system and a response of the server system.

FIG. 3 illustrates an exemplary system 300 in which a client computing system 310 submits code for execution to a server system 350 according to an implementation of the present disclosure. Although the client computing system 310 and the server system 350 communicate over a network, the network itself is not shown in FIG. 3.

In the example of FIG. 3, in addition to an operating system and other support programs (not shown), the client computing system 310 interacts with the server system 350 using two programs: a network browser 320 and a client listener program 330. A network browser 320, such as Microsoft Internet Explorer® made available by the Microsoft Corporation of Redmond, Wash., is commonly used to communicate with a host or server system, whether to access web pages over the World Wide Web, or to submit requests and execute code in the development of a software program 350. The network browser 320 also may be used to access the error logs 360 of the server system 350. In a Microsoft Windows® operating environment, the client listener program 330 may be implemented as a Win32 application.

The client listener program 330, according to implementations of the present disclosure, facilitates the handling of assert messages 360 generated by the server system 350 in at least three ways. First, execution of the client listener program 330 sends metadata 340 to the server system 350 to open a communication between the server system 350 and the client computing system 310. Second, when the server system 350 generates one or more assert messages 390 for the client computing system 310, the client listener program 330 provides an interface to present the assert messages 390 to the user of the client computing system 310. Third, the client listener program 330 provides an interface to solicit a response from the user of the client computing system 310 as to how the user wants to respond to the assert message or messages 390.

When Microsoft Internet Explorer® or a similarly configured network browser 320 is used to send information to the server system 350, the network browser 320 causes the client computing system 310 to send metadata to the server system in the form of a user agent string. According to an implementation of the present disclosure, when the client listener program 330 is executed, the client listener program modifies a registry of the network browser 320 to modify the user agent string sent to the server system 350. The modified user agent string generally provides two elements of information to the server system 350: (1) an indication that a client listener program is ready to receive assert messages 360 from the server system 350; and (2) address information to direct the server system 350 as to where the assert messages 360 should be sent. For example, the client listener program 330 may modify the registry of the network browser application to transmit a user agent string including the following information:

SDAPORT=8080

This user agent string indicates to the server system that a client listener program, which in one implementation is termed a "server debug assert" (SDA) program is accessible to the server system 350 at port 8080. The metadata 360 also may provide information including the Internet protocol (IP) address of the client computing system and other parameters that may determine how the client computing system 310 and the client listener program 330 will operate with the server system 350. When the user of the client computing system 310 submits a request, such as via the network browser 320, content of the metadata 360 is associated with the request to allow the server system 350 to send In one implementation of the present disclosure, upon receiving the metadata 360 from the client listener program 330 executing on the client computing system 310, the server system 350 logs an entry in memory and/or storage 370 responsive to the metadata 360. Specifically, the entry in the memory/storage 370 of the server system 350 may indicate the presence of the client listener program 330 accessible using the address information included in the metadata 360.

The server system 350 is suitably modified with code configured to use the metadata 360. In a Microsoft Windows® operating environment, the server system software includes a server side server debug assert (SDA) messenger dynamic link library (DLL). As understood by those familiar with the Microsoft Windows® operating environment, the server-side SDA messenger DLL is registered with the Windows registry, such as by executing a regsvr32.exe naming the server-side SDA messenger DLL as the argument of the registration command. Then, when an assert fires on the server system in response to an error in the execution of the code, the assert code on the server system instantiates the server-side SDA messenger DLL. The server system 350 retrieves the address information from the memory/storage 370 of the server system 350 and provides this information to the server-side SDA messenger DLL to cause the assert message 390 to be presented to the client computing system. Alternatively, instead of providing a separate server-side SDA messenger DLL, the functionality of the server-side SDA messenger could be combined in an existing application DLL or any other computer readable format.

The assert messages 390 include information about the source of the error. For example, the information may identify several details about the code that resulted in the error, including: a version designation, a file designation, a line identifier, an error type, and a description of the error. This information assists a user in identifying the source of the error to assist the user in trying to correct the error. Collection of this type of information may be performed on the server system 350 and stored in an error log 380. Conventionally, however, the error log 380 is the only source of such information and is only made available to the user when the user accesses the error log 380 to seek this information. Conventionally, this information is not collected and included in an assert message that is directed to the client computing system 310 contemporaneously with the occurrence of the error.

Information about the error type may be used to catalog error messages and/or allow a user to decide if or how to respond to the error. For example, some error tracking and debugging systems allow for the opening of error logs or error tags when a type of error is first detected or otherwise arises to a level of interest. When an error occurs, it can be determined by the server system 350, either using locally stored data or by referencing data stored on another server system, if an error tag is associated with the error that has occurred. The resolution of such a tagged error may then be assigned to a particular individual or group for resolution or, alternatively, it may be understood that some users or groups are not expected to deal with errors of a particular type such that those types of errors can be ignored. In implementations of the present disclosure, when error tagging information is provided, the client listener program 330 may be configured to enable a user to select to ignore not only a particular assert message 390, but the user may also select to ignore all assert messages 390 associated with a particular error tag. The user can then later access the error logs 380 to debug errors associated with the error tag in a conventional way or trust that some other individual or group with which the error tag is associated will correct or debug that particular error.

When one or more assert messages 390 are received by the client listener program 330 on the client computing system 310, the client computing system 310 presents the one or more assert messages to the user. In one implementation, the assert messages 390 are presented to the user in a window, such as a pop-up window, presented on a graphical user interface or other visual interface supported by the client computing system 310. As described further below with reference to FIG. 4, the window presented provides the user of the client computing system 310 with an opportunity to respond to the assert messages 390. Alternatively, instead of presenting the assert messages 390 in a window, the assert messages 390 may be presented to an identified user as an e-mail message, as a page sent to a designated device, as an audible signal to be generated by the computer or by another specified audio communication device, or in any other manner calculated to be received by a user of the client computer system 310.

Operation of the Client Listener Program

Figure 4:
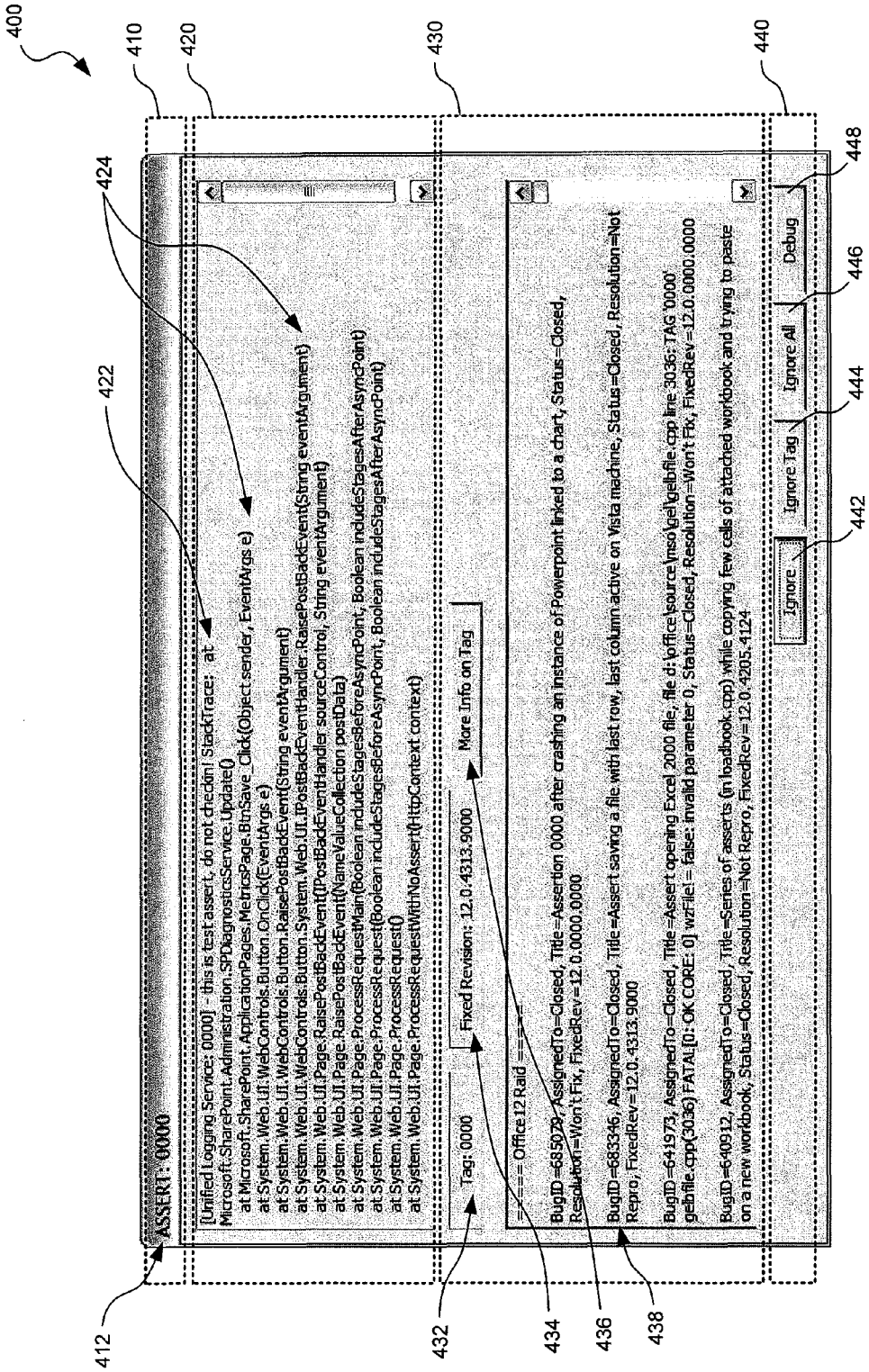
FIG. 4 is a screen view of an assert message window displaying an assert message generated on a server system and presented by a client listener program.

FIG. 4 shows an example of an assert message window 400 used by the client listener program 330 (FIG. 3) to display assert messages received from a server system 350. The assert message window 400 is presented via a visual interface as a standalone window. However, as described in the foregoing paragraph, assert messages may be presented in any number of ways.

The assert message window 400 includes four sections: an assert message identifier 410; current error information 420 listing information about the nature of the current error; error tag information 430 (if used or available) listing information about a previously recognized type of error; and response options 440 available to the user.

The assert message identifier 410 presents an assert message designation, such as a name or number associated with the assert message 400. In FIG. 4, the displayed assert message 400 includes the assert message designation "ASSERT: 0000" 412. According to one implementation of the present disclosure, an assert message designated "0000" indicates an assert message that has not yet been associated with an error tag. Once an error has been associated with an error tag, the error tag will be assigned a name, for example, a four-character designation. Subsequent assert messages associated with the error tag will then be associated with the error tag name, and that designation will appear in the assert message identifier 410. For example, in FIG. 7, the assert message window 700 includes an assert message identifier "ASSERT: ctfi" 710. The designation "ctfi" identifies the error tag with which the assert message is associated.

The current error information 420 provides information attending the occurrence of the error. For example, the current error information 420 identifies the type or error detected 422 and reproduces the code that was executing at the point at which the error occurred. This information should be helpful in correcting the error.

The tag information 430 provides a range of information regarding whether the error being reported in the assert message has been previously identified and/or previously resolved. The tag information 430 may include a tag number 432 used to differentiate between historical and current errors that have been tagged for resolution. A resolution indicator 434 indicates the status of the tagged error, for example, specifying whether the error was, at least, purportedly resolved. An additional info button 436 allows the user an option of learning more about the tagged error, if such information is available. Tag details 438 provide information describing a designation assigned to the error, a person or group to which the error was assigned for resolution, a description of the error, and other information about the tagged error.

The response options 440 provide the user with the opportunity to selectively respond to the assert message. In the implementation depicted in FIG. 4, the response options 440 include multiple buttons a user can select to choose a desired option. An ignore button 442 allows the user to do use that: ignore the assert message, causing the message to be removed from the display to allow the user to focus on another topic. An ignore tag button 444 allows the user to ignore not only the current asset message, but also subsequent errors that have been associated with the same tag. Accordingly, if a tag identified in the assert message already has been assigned to another owner for resolution or does not call for the user to respond at this time or any time, the user can select the ignore tag option 444 to prevent assert messages associated with the same tag from being presented to the user. An ignore all option 446 will result in the current assert message, and any other subsequent assert message associated with the user's current request, to be repressed. By ignoring all the messages, the user can concentrate on another matter without being presented with any errors resulting from the execution of the code.

The response options 400 also include a debug button 448. The debug button 448 may be configured to initiate different types of responses. In one implementation, selecting the debug button 448 may terminate execution of the code (if the code is still executing). Alternatively, the debug button 448 may be configured to initiate local tools or server-based tools to facilitate debugging the code.

Although not shown in FIG. 4, if the code is executed in a synchronous mode as explained below, the response options 440 also may include an abort option (not shown) as further described below with reference to FIG. 7. In a synchronous mode, the occurrence of an error results in the generation of an assert message and halts execution of the code on the server pending a response from the client listener program. In such a mode, a user may elect to abort the program at the point where execution of the code halted.

Figure 5:
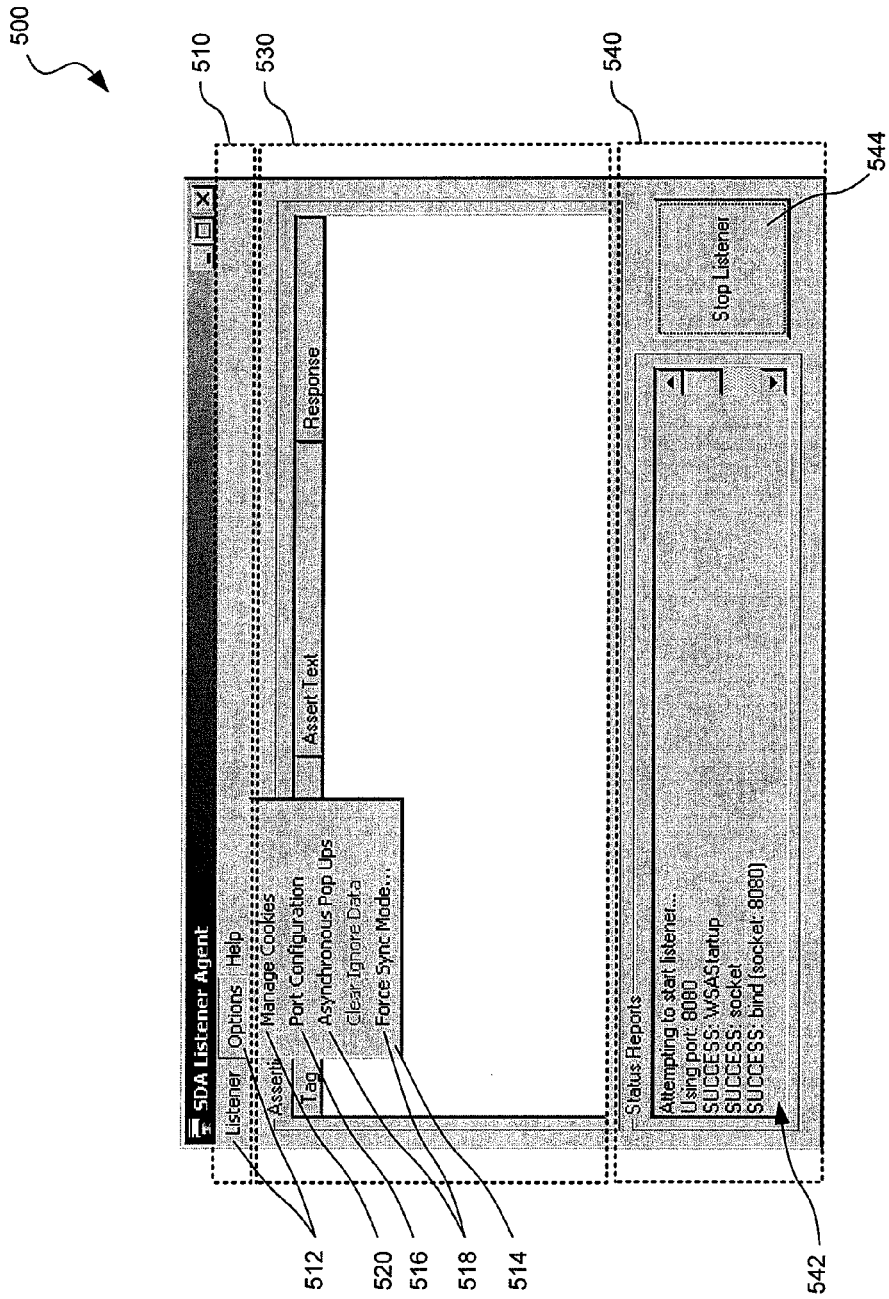
FIG. 5 is a screen view of a client listener program control window.

The client listener program may be configured to incorporate user preferences, to adjust for the network environment, or for other reasons. Like many applications, the client listener program provides an option interface to allow for adjusting the options of the client listener application Client Listener Program Options FIG. 5 illustrates a client listener program control screen 500 that allows the user to modify the operation of the client listener program 500. The control screen 500 may be presented when the client listener program is launched to present the user with an opportunity to modify the program options when the client listener program is started and/or the control screen 500 may be invoked at other times. The control screen includes three portions: a menu bar 510 allowing the user to access the options available under the client listener program; an assert list window 520 logging the assert messages received; and a status bar 540 allowing a user to check the status of the client listener program.

The menu bar 510 includes menu keys 512, such as "Listener," "Options," and "Help" that a user can select to access a menu providing access to controls relating to those keys. In the implementation of FIG. 5, the menu keys are accessible with a pointing device in a manner that is well understood to users of graphical user interface-driven programs. Thus, for example, by selecting the "Options" key, a user is presented with a menu 514 listing controls available to the user in operating the client listener program.

These options may include a port configuration 516 setting what port or ports the client computing system will use in sending information to and/or receiving information from the server system. In a default configuration, for example, the port setting may be set to a default value, but the user may be able to modify those settings to resolve possible conflicts with other programs or systems.

The menu 514 also lists options regarding asynchronous and synchronous modes 518 of operating the program. In an asynchronous mode, when an assert message is generated and sent by the server system, the server system will continue the execution of the code without waiting for a decision from the user via the client listener program as to how the user wishes to respond to the assert message. Alternatively, in a synchronous mode, the code being executed on the request received from the client computing system will be halted when the assert message is sent to the client computing system. The halt will continue until a response is received from the user via the client listener program or, in the interest of not wasting computing resources when an assert message is sent to a user who is unavailable to respond, until a timeout is reached.

In one implementation of the present disclosure, the client computing system and the server system communicate information to each other using separate port addresses. Using separate port addresses facilitates local user control of the asynchronous or synchronous mode of operation. By using separate port addresses, immediately upon receiving an assert message, the client listener program can send an acknowledgment to the server system to ensure that the server system does not hold execution of the code, promoting asynchronous operation. Alternatively, if the client listener program is set to operate in a synchronous mode, no reflexive acknowledgment will be sent to the server system, and the server system will hold execution of the code until a user responds to the assert message or a timeout limit is reached, whichever comes first.

As previously described, in one implementation, information about the client computing systems is provided to the server system using metadata. In another implementation, this information can be provided and maintained using cookies.

To illustrate an implementation of the present disclosure using cookies, the menu 514 also includes a manage cookies option 520. In such an implementation, cookies are set to identify addresses of the client listener program so that the server system can identify where to send the assert messages. The client listener program sets a cookie on the server system identifying the IP address of the client computing system and the port on which the client listener program is listening for assert messages from the server.

Figure 6:
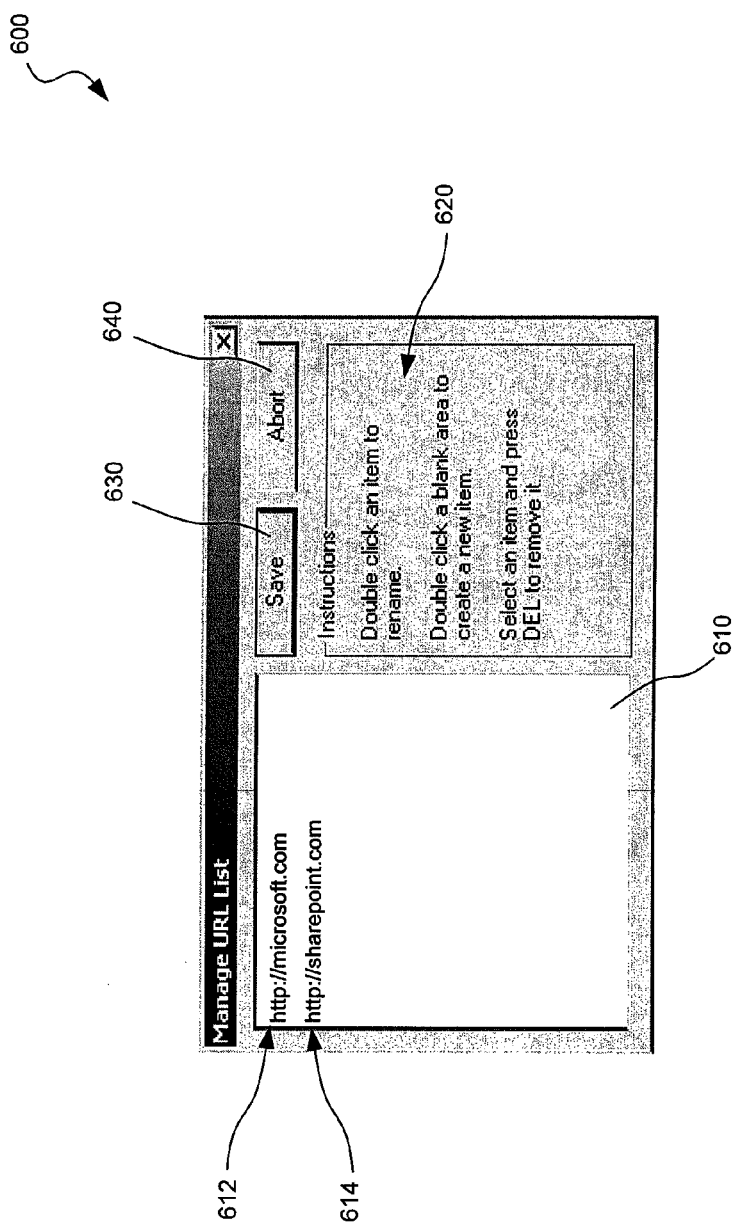
FIG. 6 is a screen view of a manage cookie window invoked from the client listener program control window of FIG. 5.

FIG. 6 shows a manage cookies window 600 that is opened when the manage cookies option 520 is selected from the menu 514 of the control screen 500 of FIG. 5. The manage cookies window 600 includes an address list 610 listing the addresses 612 and 614 (in this case, in uniform resource locator format) of servers that will receive cookie data from the client listener application. Additions, deletions, or changes can be made for the servers, as directed by instructions in a help area 620 presented by the manage cookies window 600. Once desired changes are complete, a user can accept the changes by selecting the save button 630 or disregard the changes by selecting an abort button 640.

Referring back to FIG. 5, the control screen 500 also includes the assert window 530 to log the assert messages received from the server system. The functions of the assert window 530 are further described below with reference to FIGS. 8 and 10.

The status bar 540 communicates the status of the client listener program to a user. As shown in FIG. 5, in a status window 542, the client listener program reports the status of the program including the starting of the program, the port settings, and whether the program has successfully started and established communication with a server system. When the client listener program is running, the status bar 540 also includes a stop listener button 544. The user can select the stop listener button to terminate operation of the client listener program. In one implementation, the stop listener button 544 is a toggle button such that, once the client listener program is stopped, a start listener program button (not shown) appears in its place.

In one implementation of the client listener program that uses one or more cookies to provide client information to the server system, once the program is started, a series of status messages are presented in the status bar. The messages, for example, may include the following information for the cookie settings shown in FIG. 6:

Attempting to start listener . . .
Using port: 8080
SUCCESS: WSAStartup
SUCCESS: socket
SUCCESS: bind (socket: 8080)
COOKIE: Succeeded to set cookie for [http://microsoft.com].
COOKIE: Succeeded to set cookie for [http://sharepoint.com].
Waiting for connections . . .
Successfully started listener.

Successful initiation of the client listener program will allow the client computing system to receive assert messages from the server system.

Configuring the Server System to Communicate with the Client Listener Program

To interoperate, the client listener program and the server system are configured to communicate with one another. In one implementation adapted for use with ASP.NET, an ASP-.NET function or method accesses the HttpContext object to specify the address information for the client. In another implementation, an analogous structured query language (SQL) wrapper may be used to specify the address information for SQL support.

Because the server system may be processing many requests from many clients simultaneously, the server system will have to resolve which of its clients issued the request that caused the error and if the identified client is capable of receiving assert messages over another network communication port. According to one implementation, the client communicates its capabilities to the server using hypertext transfer protocol (HTTP) headers. For example, using an Application Service Provider framework, ASP.NET, an integration wrapper uses the HttpContext variable to access a cookie set by the client listener program as described with reference to FIGS. 4 and 5 to communicate the port on which the client listener program listens for assert messages from the server system. Metadata in the user agent string or a cookie key definition used by an HTTP-based context resolution implementation may include the following definition:

SDA=PORT=XXXX;

The IP address of the client computing system is determined by the contents of a REMOTE_ADDR server variable that is also used in the HttpContext variable. With the addressing information established, the server can conduct the communication between the server system and the client computing system It should be noted that, if the context is not resolved, an attempt to communicate an assert message to the client computing system will fail. In such a case, the assert message will be logged in an error log associated with the server. In one implementation, the assert message is logged even if the context is resolved and the assert message is transmitted.

Receiving Assert Messages on the Client Computing System

As previously described, the client listener program can operate in a synchronous mode or an asynchronous mode. FIG. 7 illustrates an alternative form of an assert message window 700. The assert message window 700 is similar to the assert message window 400 (FIG. 4). The assert message window 700 shown presents an assert message received while operating in a synchronous mode and in a situation where errors are assigned tags to support error tracking. In a synchronous mode, when an error is detected, an assert message is fired and execution of the code is halted until a response is received from the user or a timeout limit is reached.

Figure 7:
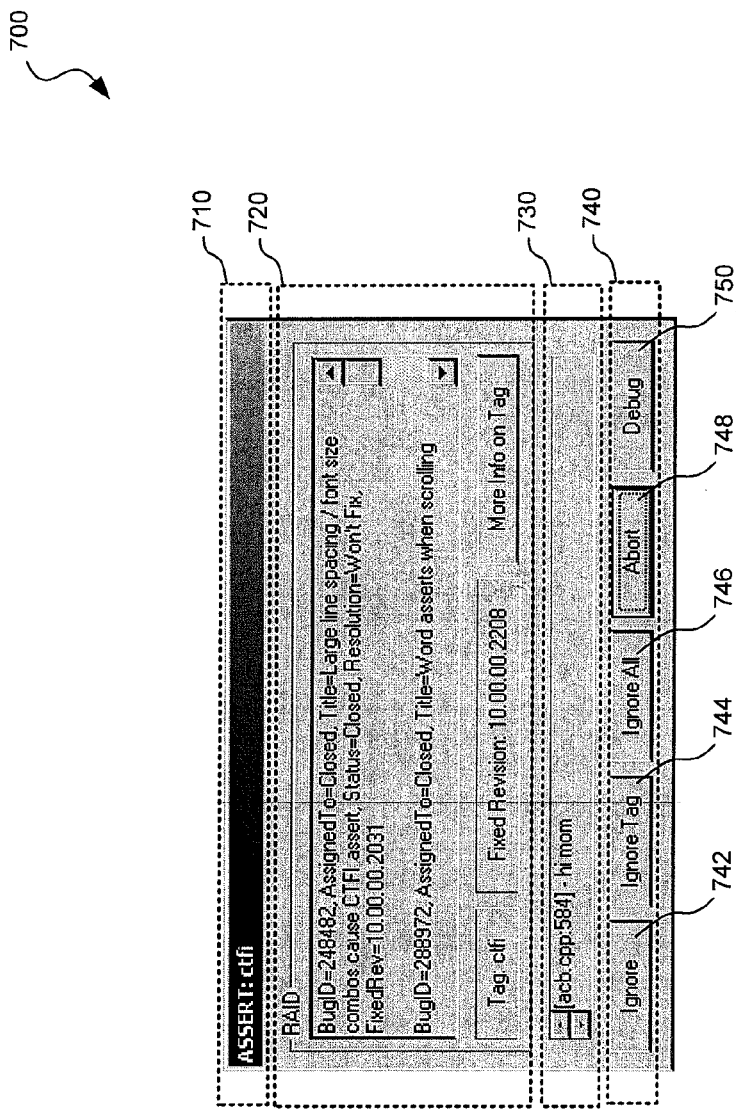
FIG. 7 is a screen view of another assert message window generated in a synchronous assert mode.

In FIG. 7, the assert message window 700 is presented on a display of the client computing system. The assert message window 700, like the assert message window 400 (FIG. 4), includes four portions: an assert message identifier 710; error tag information 720 for the tag associated with the current error; current error information 730 listing information about the source of the current error including the file, line number and assert text; and response options 740 available to the user. Alternative presentations of the assert message windows 400 and 700 are shown to demonstrate that implementations of the present disclosure Although the portions of the assert message window are comparable to corresponding portions of the displayed assert message 400 of FIG. 4, there are two points to be noted regarding the assert message window 700. First, in the error tag information portion 720, shows database entries associated with the error tag. When the assert message fires on the server, any database entries associated with the tag are downloaded for inclusion in the error tag portion 720 of the assert message. As a result, a user can review all the relevant information regarding the previous assignment and resolution of the problem associated with the tag with which the current error is associated. The error tag information may be stored on the server in a same location as the assert message data, stored in another location, or maintained by a separate server.

Second, the response options 740 in the assert message window include an additional option as compared to the displayed assert message 400 of FIG. 4. In addition to the ignore button 742, the ignore tag button 744, the ignore button 746, and the debug button 748, the assert message window 700 also offers an abort button 750. As previously described, in a synchronous mode, the server system will halt execution of the code until a response is received from a user or until a timeout limit is reached. In this case, if the user does not wish to evaluate the message even for purposes of deciding if the assert message should be ignored, the user can select the abort button 750 to stop execution of the code, rendering the message moot. In one implementation, whatever response is selected is logged in an assert message log that can be stored on the client computing system, the server system, and/or in another storage location. As previously described with reference to FIG. 4, the debug button 748, like the debug button 448 may be configured to terminate the execution of the code, which would make the debut button 748 and the abort button 750 redundant. However, because the debug button 748 also may be configured to engage debugging tools on the client computing system or on the server system, so the debug button 748 and abort buttons 750 may serve different purposes.

Figure 8:
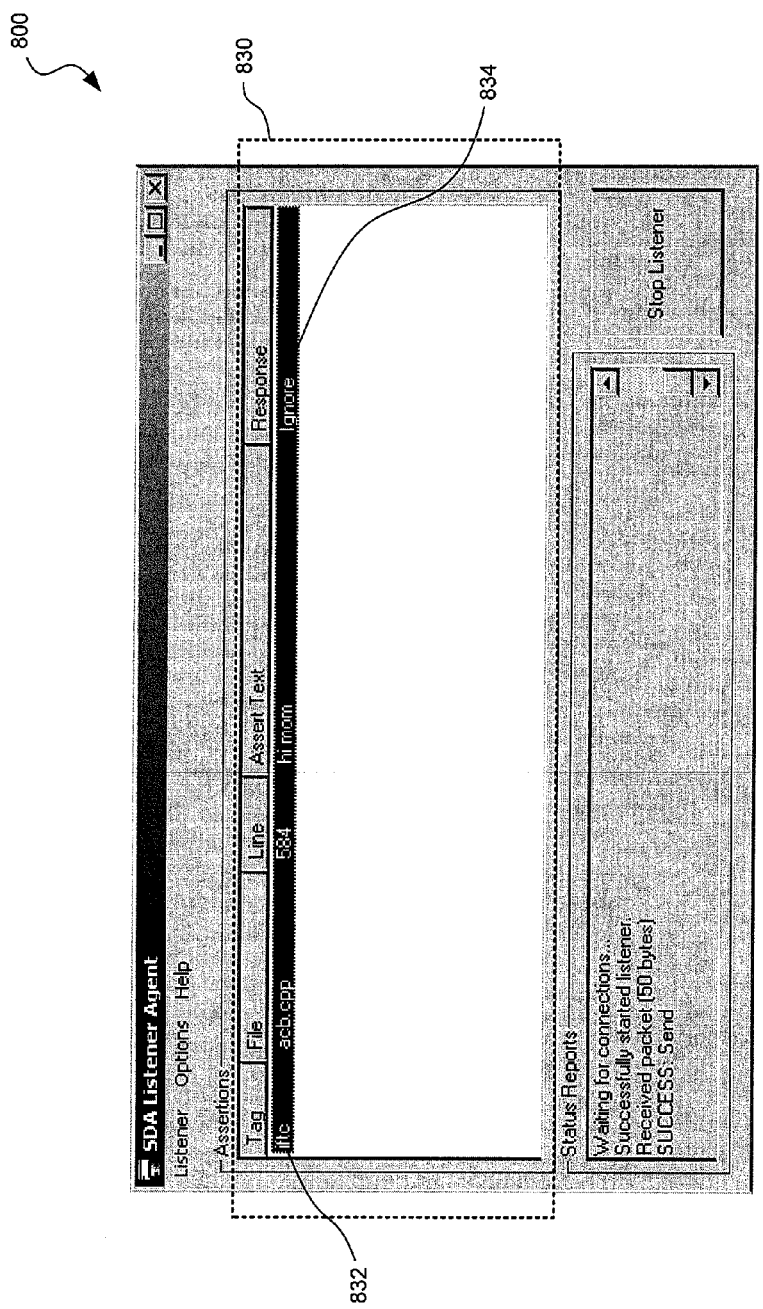
FIG. 8 is screen views of a client listener program control window showing an assert message list.

FIG. 8 shows a client listener program control screen 800 similar to that of the client listener control program screen 500 of FIG. 5. The control screen 800, in addition to allowing a user to select options for operation of the client listener program, also can be used to present a list of assert messages logged in an assert message list 830. In the assert message list, a first entry 832 corresponds with the current error information presented in the current error information 730 portion of the assert message window 700. In addition, a response entry 834 is included in the assert message list to log the response selected by the user. In this case, it is assumed the user selected the "Ignore" response and that result 834 is logged in the assert message list 830.

Figure 9:
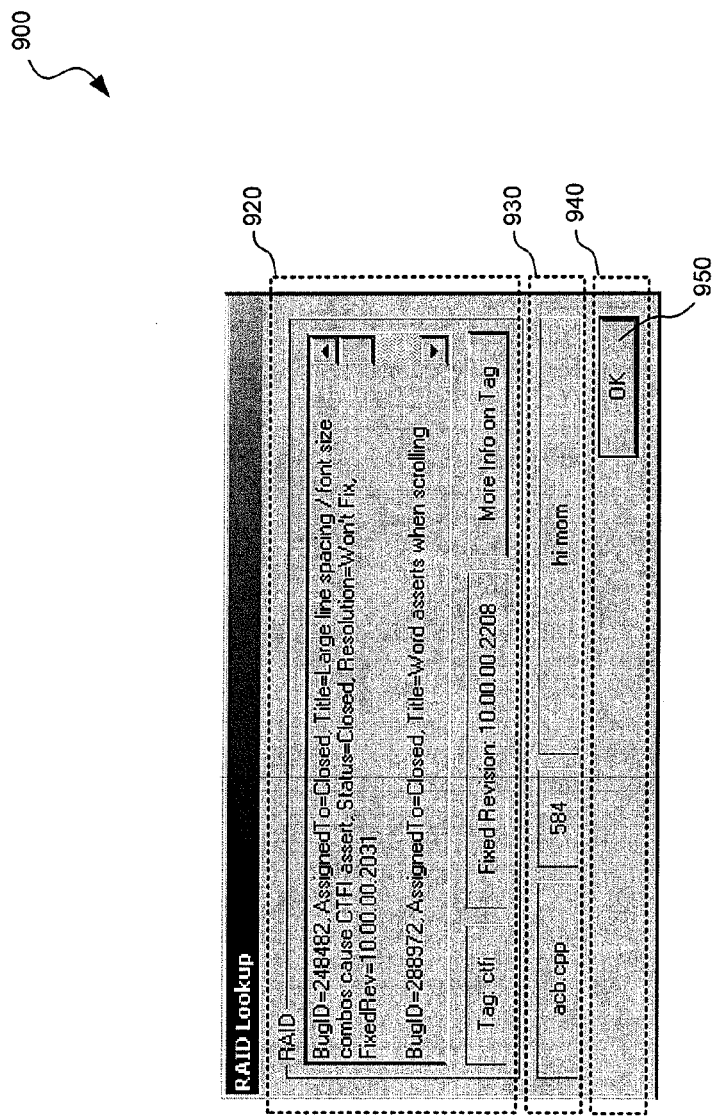
FIG. 9 is screen view of an error tag information window invoked from the assert message list of FIG. 8.

In this list view, the error tag information is not presented. However, in one implementation, the error tag information can be retrieved by selecting the entry 832 and by a predetermined command, such as "double-clicking" the entry 832, the error tag information will be downloaded and presented in an error tag window as shown in FIG. 9. The error tag window 900 is similar to the assert message window 700 of FIG. 7. The error tag window 900 includes the error tag information 720 for the tag associated with the current error and current error information 730 listing information about the source of the current error including the file, line number and assert text. The content of these portions is the same as that for the assert message window. The distinction between the assert message window 700 and the error tag window 900 is that, in the response options portion 940 of the error tag window, there is only one option: an OK option 950 to close the window. Because the assert message for which the error tag information was previously presented and responded to, the user is not presented with other options in the error tag window 900.

In addition to receiving assert messages in a synchronous mode, the assert messages also can be received in an asynchronous mode. As previously described with reference to FIG. 4, an asynchronous assert message can be presented in an assert message window to allow the user the opportunity to ignore or debug the message. However, because the asynchronous mode does not hold execution of the code, at the user's option, the user may be provided with a log of assert messages generated without presenting an assert message window each time, as shown in FIG. 10.

Figure 10:
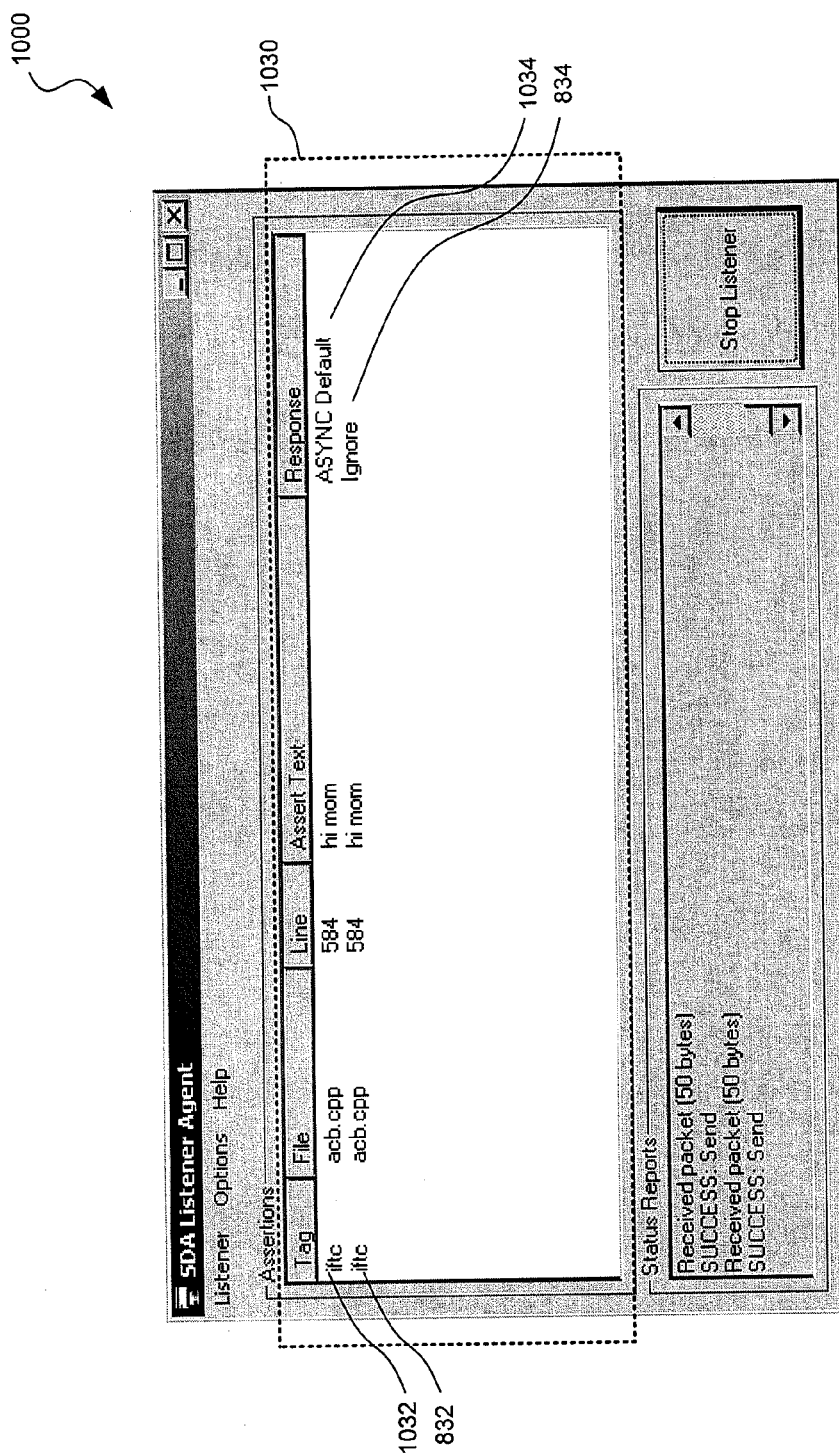
FIG. 10 is a screen view of a client listener program control window showing listing of assert messages logged in both synchronous and asynchronous modes.

FIG. 10 shows a client listener program control window 1000 presenting and assert message list 1030. The assert message list 1030 includes entries for assert messages received during the current session. In the example of FIG. 10, the assert message list includes the entry 832 for synchronous mode assert message of FIG. 8, as well as a more recent entry 1032 representing an asynchronous assert message. As previously described the entry 832 for the synchronous mode assert message which shows a response of "Ignore" 834 because a response must be received or a timeout reached in response to synchronous messages. On the other hand, for an asynchronous assert message entry 1032, no response is required because code execution is not halted. Accordingly, the asynchronous assert message 1032 is associated with an "ASYNC Default" response 1034.

Process of Displaying Assert Messages on a Client Computing System

Figure 11:
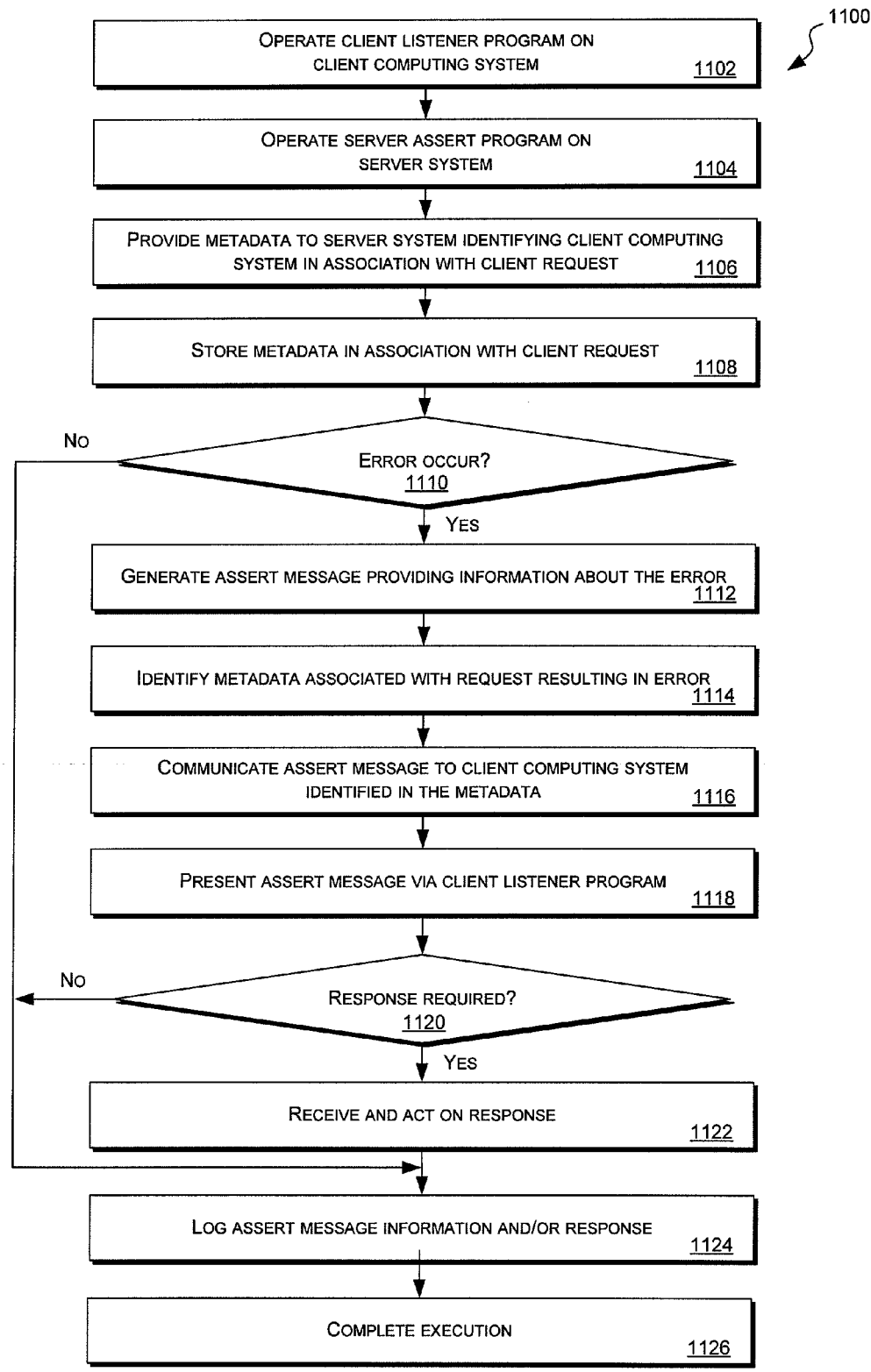
FIG. 11 is a flow diagram of a process for displaying assert messages on a client computing system generated by a server system.

FIG. 11 is a flow diagram 1100 of an implementation of the present disclosure. Specifically, the flow diagram 1100 describes a process for displaying assert messages on a client computing system where the assert messages describe errors occurring during the execution of code on a server system. As will be understood in light of the many variations described and suggested in the foregoing description, the flow diagram 1100 describes only one process for implementing the present disclosure.

At 1102, a client list that program is operated on the client computing system. At 1104, a server assert program is operated on the server system. As previously described, the client computing system and the server system communicate with each other over a network. As also previously described, operation of the programs includes applying relevant modifications and registrations to enable the programs to communicate with each other.

At 1106, metadata is provided by the client computing system to the server system. The metadata identifies the client computing system in association with a client request made to the server. For example, the metadata may include port and IP address information for the client computing system that is provided to the server system when the client computing system submits a request for execution on the server system. At 1108, in a server system, the metadata is stored in association with the client request. As a result, for example, if the request submitted by the client computing system results in execution error, the server system will be able to identify the client computing system that submitted the code resulting in the error.

At 1110, it is determined if an error has occurred during execution of the client request. If it is determined at 1110 that no errors have occurred, the flow diagram 1100 proceeds to 1126 to complete execution of the client request. On the other hand, if it is determined at 1110 that an error has occurred, at 1112, an assert message is generated providing information about the occurrence of the error. As previously described, the information about the error may include several pieces of information. The information about the error message may include a numeric designation or another designation of the assert message. The information may include details about the occurrence of the error including version information, file information, line information, and other information about the error. The information also may include error tag information describing the nature of the error, a person or persons responsible for resolving the tagged error, and similar information. As previously described, the error tag information may be maintained within the server system or retrieved from a separate location or server system.

At 1114, the metadata associated with request resulting in the error is identified. The metadata includes an address and port information allowing a server system to identify and communicate with the client computing system initially submitting a request. At 1116, the assert message is communicated to the client computing system identified in the metadata. At 1118, the assert message is presented to the user through the client listener program operating on the client computing system.

At 1120, it is determined if your response is required to the assert message. As previously described, assert messages may be presented either in a synchronous mode, in which a response must be received or a timeout limit reached before execution of the code will continue, or in an asynchronous mode in which no response must be received for the server system to continue execution of the request. If it is determined at 1120 that no response is required, the flow diagram 1100 proceeds to 1124 to log the assert message information. On the other hand, if it is determined at 1120 that a response is required, the flow diagram 1100 proceeds to 1122 to receive and act on the response. As previously described, in an asynchronous mode, depending on the client listener program options selected, an assert message window may be presented giving the user the opportunity to ignore the assert message, ignore assert messages having the same tag, ignore all assert messages, or debug the cause of the assert message. In synchronous mode, in addition to these options, the user also is given the option to abort execution of the request that led to the assert message. In synchronous mode, reaching a timeout limit also may constitute a response allowing execution of the code to continue.

At 1124, assert message information, including a response presented (if any) is logged. As previously described, what an assert message is generated, it is desirable that the assert message be logged on the server system. In addition, when a client computing system receives an assert message, the assert message or messages received desirably are logged on the client computing system to allow the user to review and analyze the assert messages. At 1126, execution of the client request is completed. In one implementation of the present disclosure, when the client request is complete, the metadata presented by the client is released from storage on the server system. Metadata describing the client computing system will be presented and stored when the next client request is submitted.

The above specification, examples and data provide a complete description of the manufacture and use of the composition of the invention. Because many embodiments of the invention can be made without departing from the spirit and scope of the invention, the invention resides in the claims hereinafter appended.

We claim:

1. A computer-implemented method, comprising:
operating a client listener program on a processor of a client computing system, the client listener application being configured to:
  open a communication between a server system and the client computing system to exchange data over a network;
  executing a first program on the client computing system that is configured to request the server system to execute code;
  process assert messages not received by the first program, wherein the client listener program executes separately from the first program;
  the client listener program providing metadata to the server system identifying the client computing system in association with a client request by the first program for execution of code on the server system; wherein the metadata provides identifying information to the server system that indicates the client listener program to deliver any assert messages and wherein the client listener program modifies a user agent string sent from the first program and identifies a port of the client listener program to receive the assert messages that is separate from the first program;
  receive an assert message using the client listener program through the communication from the server system indicating an error resulting from the execution of the code on the server that was requested by the first program on the client computing system; wherein the assert message identifies information about the code that resulted in the error;
  signal receipt of the assert message over a user interface of the client listener program on the client computing device; wherein the user interface provides functionality for changing configuration information for the client listener program, wherein the configuration information comprises an address configuration of where to send the alert messages and an option to change server operation from an asynchronous mode and a synchronous mode for operations relating to the client requested execution of code on the server; and
  provide an opportunity for a user to respond to the assert message via the user interface; and
the client listener program communicating with a server assert program on the server system, the server assert program being configured to:
  store the metadata in association with the client request for execution of code on the server system;
  identify the metadata associated with the client request for the execution of the code resulting in the error;
  generate the assert message providing information about the error;
  storing the error in a log for later retrieval;
  instantiating a messenger in response to an occurrence error that is used to deliver the assert message to the client computing device; and
  communicate the assert message using the messenger over the network to the client listener program on the client computing system identified in the metadata.

2. The computer-implemented method of claim 1, further comprising, when the user submits the client request for execution of code on the server using a browser application:

further configuring the client listener program to modify the browser registry; and submitting the metadata in the user agent registration.

3. The computer-implemented method of claim 1, wherein the metadata is provided using one or more cookies.

4. The computer-implemented method of claim 1, wherein the metadata provided to the server system includes:
a port address of the client; and
an Internet protocol address of the client.

5. The computer-implemented method of claim 4, wherein the port address of the client includes a first port address by which the server system communicates information to the client computing system, the first port address being different than a second port address by which the client computing system communicates information to the server system.

6. The computer-implemented method of claim 1, wherein the assert message provides details about a source of the error including one or more of:
a version identifier;
a file identifier; and
a line identifier.

7. The computer-implemented method of claim 1, wherein the assert message adheres to a common format observed by both the client computing system and the server system, the common format including one or more of:
a binary format;
a text format; and
an extensible markup language format.

8. The computer-implemented method of claim 1, wherein the client listener program is further configured to signal receipt of the assert message by presenting a window through a graphical user interface, and the opportunity for the user to respond to the assert message via the user interface includes one or more of:
an ignore option to ignore a current assert message;
an ignore all option to ignore the current assert message and one or more subsequent assert messages;
an ignore tag option to ignore the current assert message and one or more subsequent assert messages identified as being associated with an error type having already been identified and tagged for analysis; and
a debug option to analyze the error.

9. The computer-implemented method of claim 1, wherein, upon the assert message being generated and communicated to the client computing system, the server assert program operates in one of:
an asynchronous mode, wherein the server system continues the execution of the code; and
a synchronous mode, wherein the server system halts the execution of the code until one of:
a response to the assert message is received from the client computing system; and
a timeout limit determined for the response to the assert message to be received from the client computing system is reached.

10. A computer-readable memory storing instructions executable by a computing system resulting in reporting of an error, comprising:
a client listener application configured to execute on a client computing system, the client listener program being configured to:
open a communication between a server system and the client computing system to exchange data over a network;
executing a first program on the client computing system that is configured to request the server system to execute code;
process assert messages not received by the first program, wherein the client listener program executes separately from the first program;
the client listener program providing metadata to the server system identifying the client computing system in association with a client request by the first program for execution of code on the server system; wherein the metadata provides identifying information to the server system that indicates the client listener program to deliver any assert messages and wherein the client listener program modifies a user agent string sent from the first program and identifies a port of the client listener program to receive the assert messages that is separate from the first program;
receive an assert message using the client listener program through the communication from the server system indicating an error resulting from the execution of the code on the server that was requested by the first program on the client computing system; wherein the assert message identifies information about the code that resulted in the error;
signal receipt of the assert message over a user interface of the client listener program on the client computing device; wherein the user interface provides functionality for changing configuration information for the client listener program, wherein the configuration information comprises an address configuration of where to send the alert messages and an option to change server operation from an asynchronous mode and a synchronous mode for operations relating to the client requested execution of code on the server; and
provide an opportunity for a user to respond to the assert message via the user interface; and
the client listener program communicating with a server assert program on the server system, the server assert program being configured to:
store the metadata in association with the client request for execution of code on the server system;
identify the metadata associated with the client request for the execution of the code resulting in the error;
generate the assert message providing information about the error;
storing the error in a log for later retrieval;
instantiating a messenger in response to an occurrence error that is used to deliver the assert message to the client computing device; and
communicate the assert message using the messenger over the network to the client listener program on the client computing system identified in the metadata.

11. The computer-readable memory of claim 10, further comprising, when the user submits the client request for execution of code on the server using a browser application:
further configuring the client listener program to modify the browser registry; and
submitting the metadata in the user agent registration.

12. The computer-readable memory of claim 10, wherein the metadata is provided using one or more cookies.

13. The computer-readable memory of claim 10, wherein the metadata provided to the server system includes one or more of:
a port address of the client; and
an Internet protocol address of the client.

14. The computer-readable memory of claim 13, wherein the port address of the client includes a first port address by which the server system communicates information to the client computing system, the first port address being different than a second port address by which the client computing system communicates information to the server system.

15. The computer-readable memory of claim 10, wherein the client listener program is further configured to signal receipt of the assert message by presenting a window through a graphical user interface, and the opportunity for the user to respond to the assert message via the user interface includes one or more of:
   an ignore option to ignore a current assert message;
   an ignore all option to ignore the current assert message and one or more subsequent assert messages;
   an ignore tag option to ignore the current assert message and one or more subsequent assert messages identified as being associated with an error type having already been identified and tagged for analysis; and
   a debug option to analyze the error.

16. The computer-readable memory of claim 10, wherein the assert message provides details about a source of the error including one or more of:
   a version identifier;
   a file identifier; and
   a line identifier.

17. A system, comprising: a processor and a computer-readable memory; a server system; a client computing system; a client listener program executing on the processor of the client computing system, the client listener program being configured to: open a communication between a server system and the client computing system to exchange data over a network; executing a first program on the client computing system that is configured to request the server system to execute code;
   process assert messages not received by the first program, wherein the client listener program executes separately from the first program;
   the client listener program providing metadata to the server system identifying the client computing system in association with a client request by the first program for execution of code on the server system; wherein the metadata provides identifying information to the server system that indicates the client listener program to deliver any assert messages and wherein the client listener program modifies a user agent string sent from the first program and identifies a port of the client listener program to receive the assert messages that is separate from the first program;
   receive an assert message using the client listener program through the communication from the server system indicating an error resulting from the execution of the code on the server that was requested by the first program on the client computing system; wherein the assert message identifies information about the code that resulted in the error;
   signal receipt of the assert message over a user interface of the client listener program on the client computing device; wherein the user interface provides functionality for changing configuration information for the client listener program, wherein the configuration information comprises an address configuration of where to send the alert messages and an option to change server operation from an asynchronous mode and a synchronous mode for operations relating to the client requested execution of code on the server; and
   provide an opportunity for a user to respond to the assert message via the user interface; and the client listener program communicating with a server assert program on the server system, the server assert program being configured to:
   store the metadata in association with the client request for execution of code on the server system; identify the metadata associated with the client request for the execution of the code resulting in the error;
   generate the assert message providing information about the error;
   storing the error in a log for later retrieval;
   instantiating a messenger in response to an occurrence error that is used to deliver the assert message to the client computing device; and
   communicate the assert message using the messenger over the network to the client listener program on the client computing system identified in the metadata.

18. The system of claim 17, wherein the metadata includes one or more of: a port address of the client; and an Internet protocol address of the client.

19. The system of claim 18, wherein the port address of the client includes a first port address by which the server system communicates information to the client computing system, the first port address being different than a second port address by which the client computing system communicates information to the server system.

20. The system of claim 17, wherein, upon the assert message being generated and communicated to the client computing system, the server assert program operates in one of:
   an asynchronous mode, wherein the server system continues the execution of the code; and a synchronous mode, wherein the server system halts the execution of the code until one of: a response to the assert message is received from the client computing system; and a timeout limit determined for the response to the assert message to be received from the client computing system is reached.

* * * * *